(12) United States Patent
Craig et al.

(10) Patent No.: US 12,187,471 B2
(45) Date of Patent: Jan. 7, 2025

(54) FRUIT PACKAGING TRAY, APPARATUS AND PROCESS

(71) Applicant: PUNCHBOWL AUTOMATION IP LIMITED, Pukekohe (NA)

(72) Inventors: Robert Craig, Pukekohe (NZ); Mark Roche, Pukekohe (NZ); Simon Craig, Pukekohe (NZ); Michael Powick, Waitara (NZ)

(73) Assignee: PUNCHBOWL AUTOMATION IP LIMITED, Pukekohe (NZ)

( * ) Notice: Subject to any disclaimer, the term of this patent is extended or adjusted under 35 U.S.C. 154(b) by 202 days.

(21) Appl. No.: 17/624,604

(22) PCT Filed: May 13, 2020

(86) PCT No.: PCT/NZ2020/050052
§ 371 (c)(1),
(2) Date: Jan. 4, 2022

(87) PCT Pub. No.: WO2020/231276
PCT Pub. Date: Nov. 19, 2020

(65) Prior Publication Data
US 2022/0267039 A1 Aug. 25, 2022

(30) Foreign Application Priority Data

May 13, 2019 (AU) .................................. 2019901622
Sep. 25, 2019 (AU) .................................. 2019903570

(51) Int. Cl.
*B65B 25/04* (2006.01)
*B65B 11/08* (2006.01)
(Continued)

(52) U.S. Cl.
CPC ............ *B65B 25/046* (2013.01); *B65B 11/08* (2013.01); *B65B 35/56* (2013.01); *B65D 1/36* (2013.01);
(Continued)

(58) Field of Classification Search
CPC ....... B65B 25/046; B65B 11/08; B65B 35/56; B65D 85/34; B65D 1/36; B65D 81/05; B65G 2201/0211
See application file for complete search history.

(56) References Cited

U.S. PATENT DOCUMENTS

| 3,572,005 A | 3/1971 | Allen et al. |
| 3,908,337 A | 9/1975 | Zimmerman et al. |

(Continued)

FOREIGN PATENT DOCUMENTS

| FR | 2129429 A | 10/1972 |
| NZ | 207705 A | 3/1987 |

(Continued)

OTHER PUBLICATIONS

Karve, Kiran (Authorized Officer), International Preliminary Report on Patentability dated Aug. 24, 2021, International Application No. PCT/NZ2020/050052, 28 pages (including Response to Written Opinion).

*Primary Examiner* — Anne Marie Antonucci
*Assistant Examiner* — Luis G Del Valle
(74) *Attorney, Agent, or Firm* — MH2 Technology Law Group, LLP

(57) ABSTRACT

Embodiments of the invention provide a packaging tray for use in packaging items, the tray having a first region having a cross-section which defines a concave surface having one or more cross-sections suitable to receive an item and a second region having a cross-section which is substantially straight. Embodiments provide a process in which tray may (Continued)

be loaded by depositing kiwi fruit and then agitated to settle and align the kiwifruit in the concave sections assisted with the straight sections providing space for movement of the kiwifruit laterally to the concave sections and directing the kiwifruit of the agitated tray towards the concave section. The tray is wrapped after the items are deposited and the wrapped tray is loaded into a box with settled items and loads the wrapped tray into a box.

9 Claims, 9 Drawing Sheets

(51) Int. Cl.
  *B65B 35/56* (2006.01)
  *B65D 1/36* (2006.01)
  *B65D 81/05* (2006.01)
  *B65D 85/34* (2006.01)
(52) U.S. Cl.
  CPC ............ *B65D 81/05* (2013.01); *B65D 85/34* (2013.01); *B65B 2220/16* (2013.01); *B65G 2201/0211* (2013.01)

(56) References Cited

U.S. PATENT DOCUMENTS

| | | | |
|---|---|---|---|
| 3,967,433 A | 7/1976 | Bonfiglioli | |
| 6,038,831 A | 3/2000 | Nava | |
| 2005/0167317 A1* | 8/2005 | Barrett | B65D 1/30 206/557 |
| 2009/0107808 A1* | 4/2009 | Hart | B65G 47/22 198/766 |
| 2013/0048527 A1* | 2/2013 | Ramirez | B65D 77/046 206/521.1 |
| 2019/0071200 A1* | 3/2019 | Goihman | B65D 81/263 |
| 2019/0143542 A1* | 5/2019 | Scarfe | B25J 15/0052 700/218 |
| 2019/0227575 A1* | 7/2019 | Maor | G06T 5/50 |
| 2019/0315503 A1* | 10/2019 | Jensen | B65C 3/02 |
| 2019/0357585 A1* | 11/2019 | Bando | A23L 7/10 |
| 2019/0389607 A1* | 12/2019 | Kirsch | B65B 59/005 |

FOREIGN PATENT DOCUMENTS

| | | |
|---|---|---|
| WO | 2017039450 A1 | 3/2017 |
| WO | 2017046595 A1 | 3/2017 |
| WO | 2020170045 A1 | 8/2020 |

* cited by examiner

Section A - A

Section B - B

FRUIT PACKAGING TRAY, APPARATUS AND PROCESS

CROSS-REFERENCE TO RELATED APPLICATIONS

The present application claims the benefit of priority of International Patent Application No. PCT/NZ2020/050052, filed on May 13, 2020, 2020, the disclosure of which is incorporated by reference herein in its entirety.

FIELD OF THE INVENTION

This invention relates to improvements in respect of a tray, apparatus and processes for packaging items, such as packaging fruit items, and such as packaging fruit for transport.

BACKGROUND OF THE INVENTION

Conventionally, trays are loaded in packaging lines by operators depositing fruit in trays which have pockets formed therein. The pockets typically have a surface which cooperates with the shape of fruit to be loaded therein so that the fruit are bedded in the pockets and so that pressure from the tray is spread over a cooperating surface of the fruit. Loading the trays typically requires the operator to orient the fruit to align with the shaped pockets.

There is often a disparity between the rate at which given operators can align and deposit fruit in pockets, which can make control of packaging lines challenging.

There can be a challenge in staffing packaging lines with operators who can load trays at an economic rate.

Other challenges arise in some trays not being completely loaded in time.

For enhanced storage of some types of fruit require a moisture barrier which is typically made from a moisture barrier film wrapped around the fruit.

Conventionally this requires an operator to load the film into a tray prior to loading the fruit and then wrap the film around the fruit in a way such that moisture ingress and egress is controlled.

This present a challenge in controlling the quality of the fruit wrapping and do this at an economic rate.

In view of the challenges above it would be of advantage to have an automated means of wrapping fruit that has been placed in trays.

In view of the challenges above it would be of advantage to have a tray which facilitates alignment of fruit with a pocket which has a surface which cooperates with the shape of fruit.

In view of the challenges above it would be of advantage to have a tray loading apparatus which aligns fruit with a pocket which has a surface which cooperates with the shape of fruit.

In view of the challenges above it would be of advantage to have a tray loading process which aligns fruit with a pocket which has a surface which cooperates with the shape of fruit.

DISCLOSURE OF THE INVENTION

Aspects of the invention provide a process of packaging items comprising the steps of:
depositing items onto a tray having pockets for individual items;
wrapping the tray and deposited items with a sheet of wrapping material; and
loading the wrapped tray into a box which defines a tray cavity to receive the tray with deposited items.

The process may comprise a step of agitating the tray to settle the items in the pockets.

A pocket may comprise a bed having a profile complementary a cross-section of a shape characteristic of the items, and wherein a further pocket comprises a settling region having a profile directed away from the bed to allow space adjacent to the bed for an item to move with respect to the bed under agitation of the tray to allow the item to settle in the bed.

The step of loading the tray into the box may comprise moving the tray in a loading direction, depositing a leading edge of the tray in the loading direction into a leading edge of a cavity provided by the box in the loading direction and moving the box at a rate which matches the rate of movement of the tray to allow the tray with deposited items to be loaded into the tray cavity with items retained in pockets.

The step of loading the tray into the box may be subsequent to wrapping the tray with deposited items with a sheet of wrapping material.

The process may comprise steps of extending a sheet of wrapping material over a conveyor which is operable to convey the tray in the loading direction and depositing the tray with deposited items onto the sheet of wrapping material to provide a wrapping layer under the tray.

The sheet of wrapping material may comprise a first part to provide an area on which to receive a deposited tray and comprises one or more second portions dimensioned to be able to extend over the tray to provide a wrapping layer over the tray with deposited items.

The process may comprise a step of extending the sheet over a tray conveyor and over a sheet support arranged to hold the one or more second portions of the wrapping sheet in an extended configuration in which the second portion extends out from and substantially parallel to the first portion.

The sheet support may comprise a lateral conveyor arranged parallel with the tray conveyor to support a second portion in the form of a lateral flap of wrapping material.

The tray conveyor and lateral conveyor may comprise a belt extending between two rollers and the tray conveyor and lateral conveyor may be operable to move to load the sheet of wrapping onto the conveyors from a roll of wrapping material.

The process may comprise holding the wrapping material onto a conveyor by a set of vacuum apertures connected to a vacuum source.

The step of depositing may comprise depositing items as the tray is translated past the first-loading station.

The process may comprise the step of measuring the quantity of items in the depositing device and controlling a rate of translation of the tray dependent on the item quantity.

The process may comprise a step of distributing items over the width of the tray using an oscillator.

Agitating may comprise flexing the tray.

Agitating may comprise shaking the tray.

Agitating may comprise vibrating the tray.

The process may comprise a further step of, at an operator station, loading items into pockets which have not received items.

The step of depositing a number of items on the tray may comprise depositing a number of items that is a selected proportion of a number of beds of the tray.

The selected proportion may be selected dependent on operator data carrying information on a number of beds that can be filled by an operator having a characteristic rate of loading empty beds with items.

The process may further comprise moving the tray to an alignment station at which an operator aligns items not settled in beds by the agitation to settle the item in the beds.

Aspects of the invention provide an apparatus for packaging items using a tray comprising multiple beds to receive the items, the apparatus comprising:
a first loading station operable to deposit a number of items on a tray, and an agitator operable to agitate the tray to settle the items in respective beds.

Aspects of the invention provide a tray operable to receive one or more fruit items having a shape characteristic, the tray comprising:
a bed defined by a bedding surface having a profile which is complementary with at least a part of the cross-section of the shape characteristic;
a settling region adjacent to the bed, the settling region defined by a settling surface directed away from the bed to allow space for an item to move laterally with respect to the bed under agitation of the item relative to the tray.

The shape characteristic may have an elongate cross-section.

The settling surface may be directed away from the bed form below a line bisecting the complementary shape characteristic of an item received by the bed.

The settling surface may be arranged to direct towards the bedding surface an item contacting the settling surface during agitation.

The bedding surface may be complementary with a shape characteristic of items which is elongate in two axes.

The bedding surface may have a profile which is complementary to a shape characteristic defined by data collected from measurements of items.

The measurements may be taken for a sample or a population to characterise the shape of items.

The settling surface may be arranged to provide space at two or more points at the periphery of the bedding region to allow the lateral movement of the item.

The items may be fruit.

The items may be kiwifruit.

The tray may be flexible to allow agitation of the item relative to the bed by moving a tray over a roller.

The settling surface may have a profile which is substantially straight.

The beds may have a profile which is complementary with a cross-section of a shape characteristic of a population of the items, and wherein the tray may further comprise a settling region adjacent to each bed, the settling region having a profile directed away from the bed to provide space for an item to move with respect to the bed under agitation to allow the item to settle in the bed.

Aspects of the invention provide a process of wrapping a tray on which items are deposited, the process comprising:
providing a sheet of wrapping material over a conveyor which provides a lower-wrapping region on which the tray is deposited;
depositing the tray with items on the sheet of wrapping material on a central portion with one or more lateral portions extending laterally to the central portion;
moving a wrapping element from under a lateral portion of the wrapping sheet and over the deposited tray to deposit a lateral portion over the tray.

Aspects of the invention provide an apparatus operable to wrap a tray on which items are deposited, the apparatus comprising:
a conveyor operable to hold thereon a sheet of wrapping material to provide a lower-wrapping region on which the tray is deposited;
a tray depositing station operable to deposit the tray on a first portion of the sheet of wrapping material with a second portion extending from the first portion; and
a wrapping element operable to move from under the second portion of the wrapping sheet and over the deposited tray to deposit the second portion over the tray to provide wrapping material over an upper surface of the tray.

Aspects of the invention provide an apparatus operable to package items, the apparatus comprising:
a depositing device operable to deposit items onto a tray having pockets for individual items;
a wrapping device operable to wrap the tray with items deposited with a sheet of wrapping material; and
a loading device operable to load the wrapped tray into a box which defines a tray cavity to receive the wrapped tray with deposited items.

The apparatus may further comprising a transverse wrapping bar operable to move past a leading end of a tray in the loading direction to arrange wrapping material extending from the leading end to extend down over the leading edge so the wrapping material will extend under the tray as it moves into the tray box.

The apparatus may further comprise a device operable to arrange wrapping material at a trailing edge of the tray in the loading direction over the tray. Said device may be a jet operable to provide a jet of air to move the wrapping material. Said device may be a jet operable to provide a jet of air to move the wrapping material.

The apparatus may further comprise an agitation station operable to move items within in the tray after they have been deposited.

Aspects of the invention provide a tray loading apparatus comprising:
an item depositing device operable to deposit items onto a tray;
a tray conveyor operable to convey the tray in a direction of movement of items being deposited;
a measurement device operable to generate item quantity data carrying information on the quantity of items in the depositing device; and
a controller operable to control the tray conveyor and operable to control the conveyor dependent on the item quantity data.

Aspects of the invention provide an apparatus for packaging items using a tray comprising multiple beds to receive the items, the apparatus comprising:
a loader operable to place a number of items on a tray, and an agitator operable to agitate the tray to settle the items in respective beds.

Aspects of the invention provide an apparatus for packaging items using a tray comprising multiple beds to receive the items, the apparatus comprising:
a first loading station loader operable to deposit a number of items on a tray, and an agitator operable to agitate the tray to settle the items in respective beds.

Aspects of the invention provide an apparatus for packaging items using a tray comprising multiple beds to receive the items when the items are aligned with the beds, the apparatus comprising:

a loading station loader operable to deposit a number of items on a tray, an agitator operable to agitate the tray to apply agitation characterised to align a defined proportion of the number of items deposited to settle the proportion of the items in respective beds; and an alignment station at which an operator aligns items not aligned by the agitator.

Aspects of the invention provide a process for packaging items using a tray comprising multiple beds to receive the items, the process comprising:

at first loading station depositing a number of items on a tray, and at a second loading station loading items into beds which have not received items.

Further aspects reside in a tray comprising any combination of the features recited in any of the paragraphs above, or in any combination of subsets of features recited in any of the paragraphs above.

Further aspects reside in an apparatus comprising any combination of the features recited in any of the paragraphs.

Further aspects reside in a process comprising any combination of the steps or features recited in any of the paragraphs above, or in combinations of subsets of features recited in any of the paragraphs above.

As used herein the term agitate refers broadly to causing something, such as an item or tray, to move around. As used herein 'around' is not limited to circular or orbital movement.

BRIEF DESCRIPTION OF THE DRAWINGS

Additional and further aspects of the present invention will be apparent to the reader from the following description of embodiments, given in by way of example only, with reference to the accompanying drawings in which:

FIG. 5 shows a transverse cross-section 4 of a shape characteristic of a population of kiwifruit;

Further aspects of the invention will become apparent from the following description of the invention which is given by way of example only of particular embodiments.

BEST MODES FOR CARRYING OUT THE INVENTION

Figure 1:
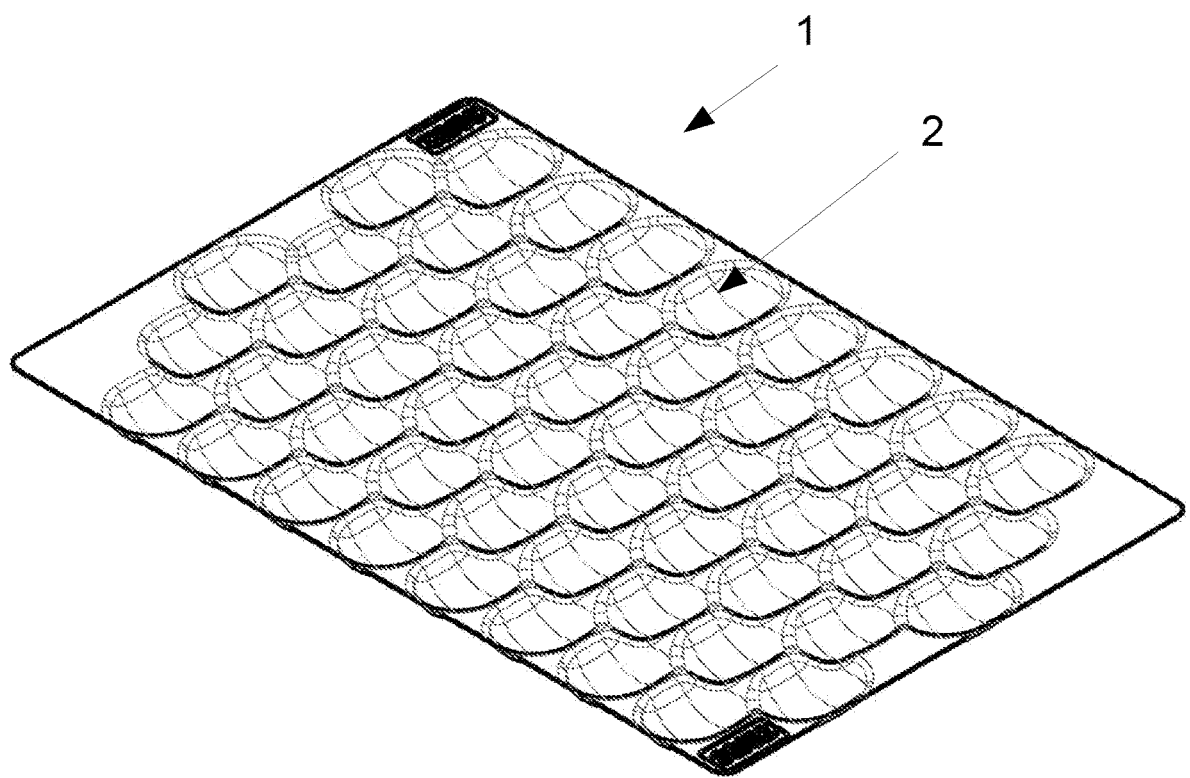
FIG. 1 shows a perspective view of a packaging tray according to an embodiment of the invention.

FIG. 1 shows a perspective view of a packaging tray 1 according to an embodiment of the invention. The tray 1 has a bed, or pocket, 2 to receive an item to be packaged. In this particular embodiment the tray 1 has multiple pockets 2. The tray 1 of this embodiment is suitable for being arranged in a stack (not shown). By action of the tray bedding the items in pockets 2 the items are held in orientations best able to spread pressure and minimise any damage to the items that may be caused if force is applied to the tray or items by trays above.

The tray 1 of FIG. 1 is adapted to receive fruit, and kiwi fruit in particular.

Figure 2:
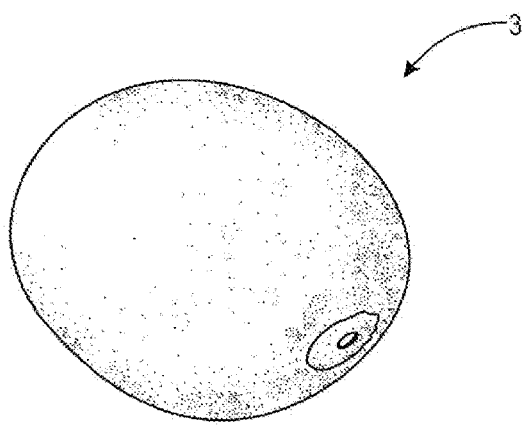
FIG. 2 shows an example of an item.

FIG. 2 shows an example of a kiwifruit 3.

Figure 3:
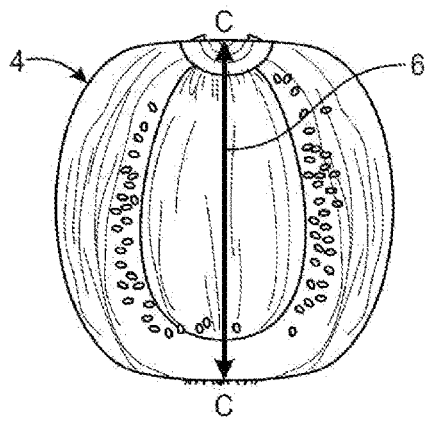
FIG. 3 shows a cross-section in a longitudinal axis of an example item in the form of a kiwifruit.

FIG. 3 shows a cross-section of an example kiwifruit in a longitudinal axis 4 (C-C).

Figure 4:
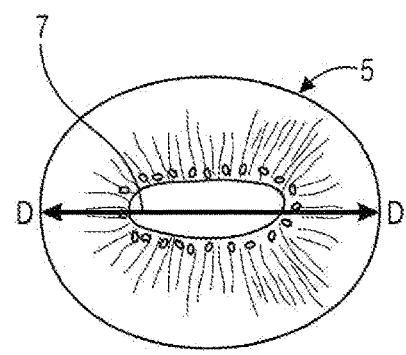
FIG. 4 shows a cross-section in a transverse axis of another example kiwifruit.

FIG. 4 shows a cross-section of another example kiwifruit in a transverse axis 5 (D-D).

Figure 5:
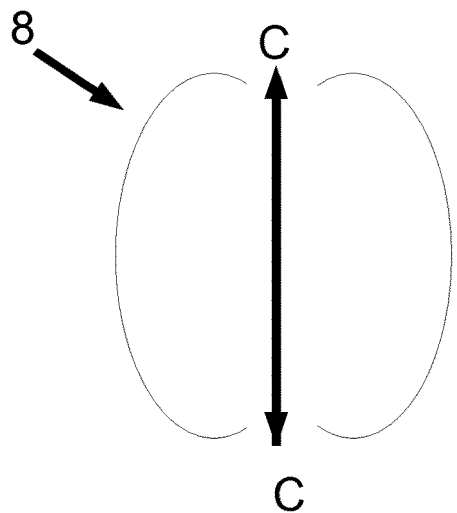
FIG. 5 shows a longitudinal cross-section 4 of a shape characteristic of a population of kiwifruit.

FIG. 5 shows a longitudinal cross-section 4 of a shape characteristic of a population of kiwifruit.

Figure 6:
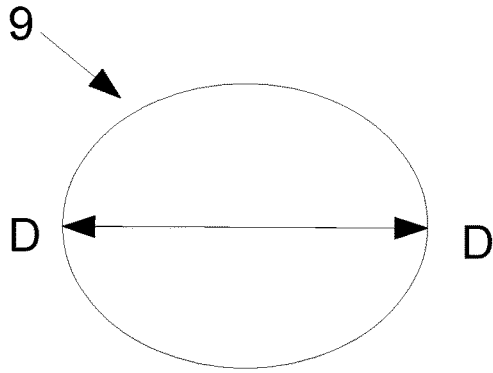
FIG. 6 shows a transverse cross-section 9 of a shape characteristic of a population of kiwifruit.

FIG. 6 shows a transverse cross-section 5 of a shape characteristic of a population of kiwifruit.

The cross-sections 4 and 5 might be representative of cross-sections of a shape characteristic determined from measurements of a representative sample of a population of kiwifruit. The population sampled may be a given grade or a given variety of item, such as a variety of kiwifruit that are to be packaged together using the tray 1. The reader will recognise these measurements as characterising the shape of the items or population of items. Suitable characterisations will be apparent to the reader. In one example characterisation the shape characteristic may be defined by the medians of given measurements made on the sample of the population. In other examples, the characterisation may be defined by means and given numbers of standard deviations of measurements made on the sample of the population.

The shape characteristic illustrated by FIGS. 5 and 6 may have an elongate cross-section 8 in the longitudinal axis 6 and another elongate cross-section 9 in the transverse axis 7, perpendicular to the longitudinal axis. The shape characteristic illustrated here may, more specifically, have a longitudinal cross-section which may be approximated by three ellipses transposed by overlapping. The shape characteristic illustrated here may also have a transverse cross-section which is approximated by a single ellipse. The reader will appreciate that for some populations the shape characteristic may have an elongate longitudinal cross-section but a circular, or approximately circular, transverse cross-section.

Figure 7:
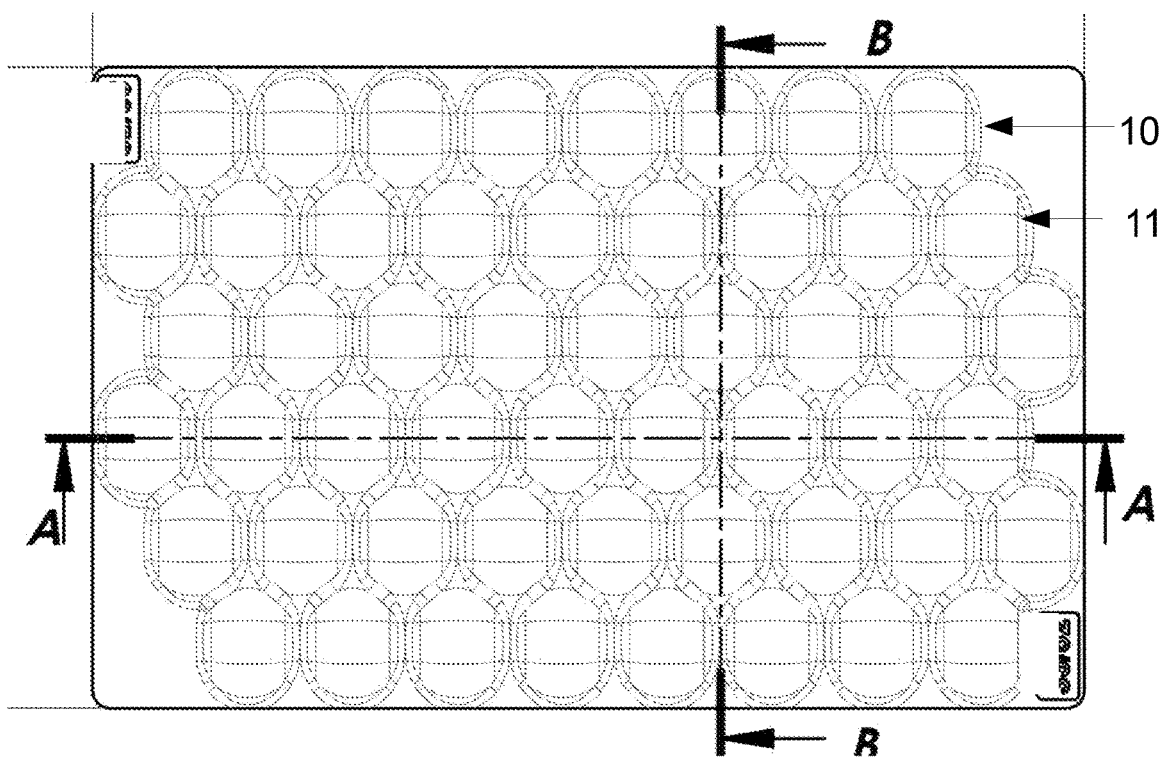
FIG. 7 shows a plan view of the packaging tray of FIG. 1.

FIG. 7 shows a top view of the tray 1 of FIG. 1. As shown the tray 1 has overlapping rows 10 and 11, for example, of beds 2. The arrangement of overlapping rows 6 and 7 maximises packing density of items and also lateral stability of a stack or filled trays.

Figure 8:
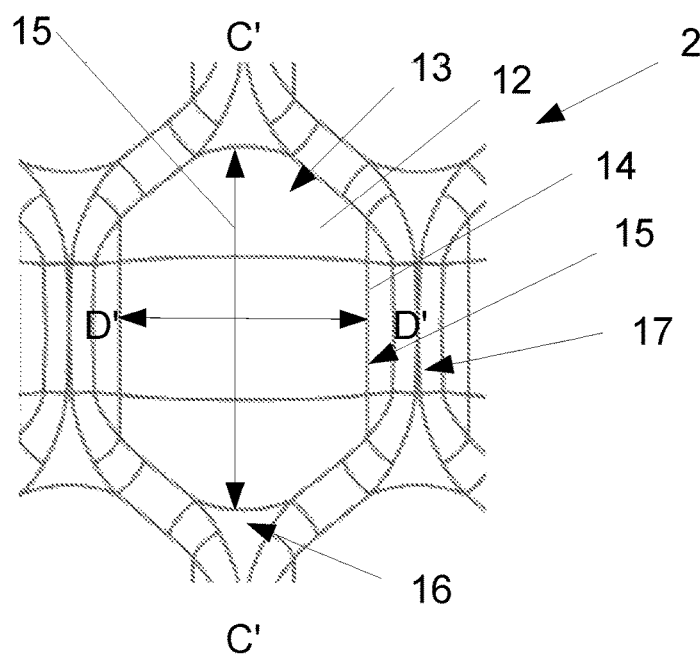
FIG. 8 shows a close-up plan view of a bed or pocket of the packaging tray of FIG. 1.
Figure 9:
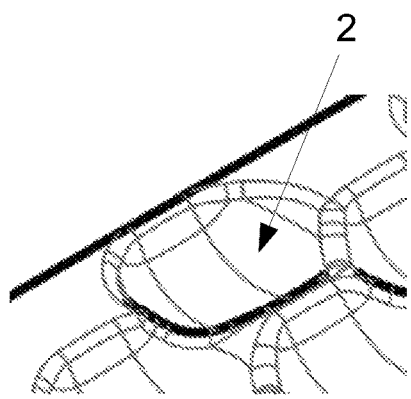
FIG. 9 shows a close-up perspective view of a portion of the tray of FIG. 1.

FIG. 8 shows a close-up plan view of a pocket portion of the tray 1 of FIGS. 1 and 7. FIG. 8 shows a bed defined by a bedding surface 12 covering a bedding region 13 which has a profile shape complementary to the shape characteristic of the item 3 so the item is able to bed into the tray 1. In this example the shape of the bedding surface is complementary to the cross-section 6 and also the cross-section 7 of the shape characteristic of the item 3. The bedding surface is concave upwards, as shown on the page, in the form which items are deposited on the tray and received by beds 2.

FIG. 8 also shows a settling surface 14. The settling surface of this embodiment has a profile which extends upwards and away from the bedding surface 12 to provide a settling region 15 adjacent to the bedding region 13.

FIG. 8 also shows a settling region 16 at an end of the bedding region 13. Also shown in FIG. 8 is a separating surface 17 which separates adjacent beds 2.

The settling region 15 provides space for an item to move around if the tray 1 is agitated. For example, an item deposited on the tray 1 with the item orientated with the longitudinal axis 6 not aligned with the longitudinal axis 15 of the bedding region 13 will not sit in the bedding region 13 with pressure spread over the surface of the item by the bedding surface 12. If the tray is jiggled or vibrated to agitate the item relative to the tray 1, the item 3 will move laterally relative to the tray 1 and bedding region and partially into and out of the settling region 15. Ongoing agitation will cause the item to rest in the bedding region 13 with the centre of gravity of the item 3 as low as possible. Because of the complementary shape of the bedding surface 12 and the cross-sections of the item 3, the orientation of the item with the lowest centre of gravity will correspond to an orientation with pressure spread and items located suitably for stacking. This is, the items are received in alignment with the beds of complementary shape by movement laterally to the tray or bed under agitation where the movement is allowed by the space provided by the settling region and where the movement would otherwise be constrained by the complementary shape of the bedding surface 12 and the shape characteristic of the item. In will be apparent to the reader that profile of the settling surface 14 illustrated acts to direct an agitated item towards the bedding region. For example, the substantially straight, upward and outward directed profile may direct an item upwards and towards the bed 13.

Figure 10:
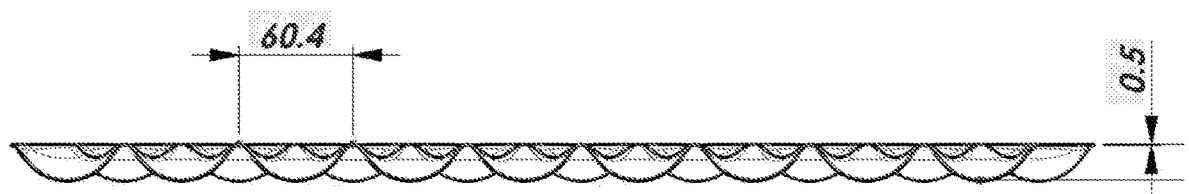
FIG. 10 shows a cut-away section of the tray of FIG. 1 along the section A-A.

FIG. 10 shows a cut-away section of the tray of FIG. 1 along the section A-A.

Figure 11:
FIG. 11 shows a cut-away section of the tray of FIG. 1 along the section B-B.

FIG. 11 shows a cut-away section of the tray of FIG. 1 along the section B-B.

Figure 12:
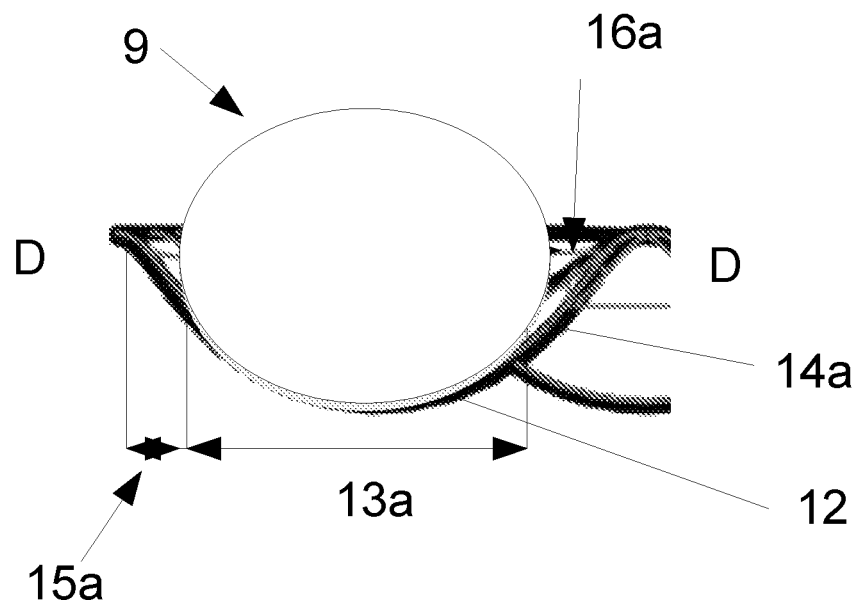
FIG. 12 shows a close-up of the cross-section of FIG. 10.

FIG. 12 shows a close-up of the cross-section of FIG. 10 illustrating the shape of the tray 1 with a lateral cross-section 9 of the shape characteristic of items 3. As illustrated, the bedding surface 12 defines a shape has a profile complementary to the cross-section 9 in a bedding region 13*a*. FIG. 12 shows the settling surface extending upwards and outwards from the curve of the bedding surface 12 to define a space 16 in the settling region 15*a*.

Figure 13:
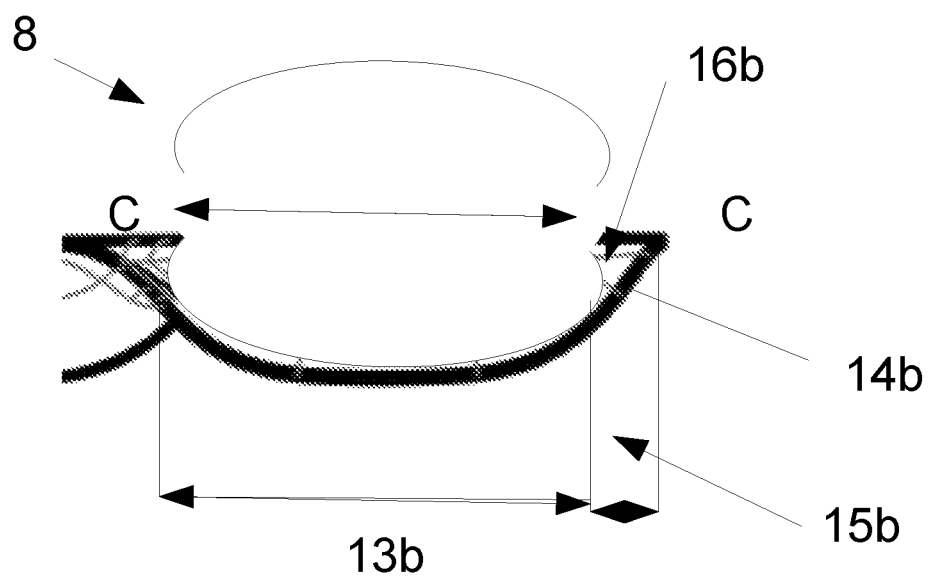
FIG. 13 shows a close-up of the cross-section of FIG. 10.

FIG. 13 shows a close-up of the cross-section of FIG. 10 illustrating the cross-section shape of the tray along the B-B of FIG. 10. As illustrated, the bedding surface 12 defines a shape which has a profile complementary in a bedding region 13*b* to the lateral cross-section 8 of the shape characteristic of the item 3. FIG. 13 shows the settling surface 14*b* extending upwards and outwards from the curve of the bedding surface 12 to define a space 16*b* in the settling region 15*b*.

FIGS. 12 and 13 illustrate that in the embodiment shown the bedding surface 12 terminates and the settling surface 14 starts at a point below a centreline of the shape characteristic of an item received. This feature allows a separating region between pockets 2 to provide further space for lateral movement of an item.

Figure 14:
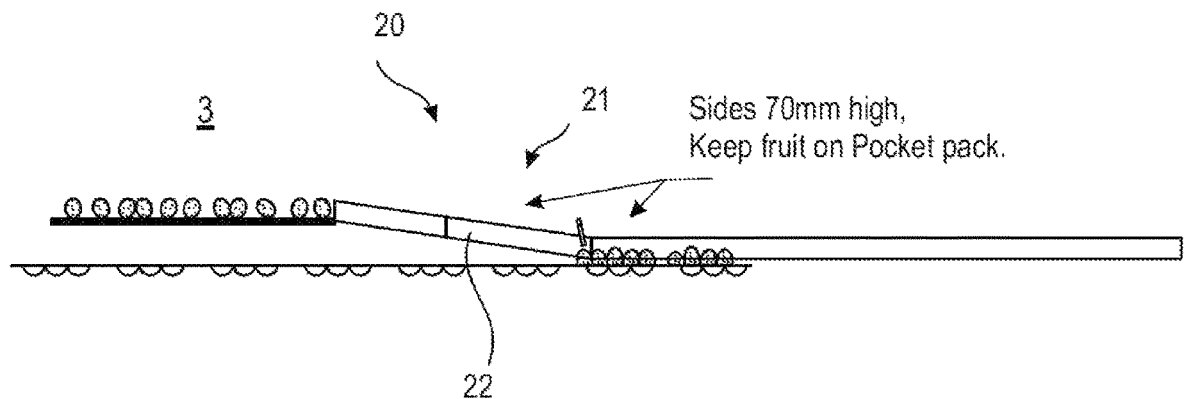
FIG. 14 shows an apparatus 20 for loading the trays.

FIG. 14 shows an apparatus 20 for loading the trays. In this embodiment the trays 1 are those of FIG. 1.

The apparatus 20 has a first loading station 21 and a second loading station (not shown). The first loading station 21 has a ramp 22 from which items to be packaged move down to be deposited on a tray 1 which is translated below the ramp 22. The ramp may be referred to as a depositor. The rate of translation of the tray may be controlled dependent on the number of items entering the ramp.

In this embodiment the first loading station 21 deposits an approximate number of items 3 that is a proportion of the number of beds in a tray 1. Some beds 2 are left empty after the first loading station 21 and these beds are filled at the second loading station. In this embodiment items are loaded manually by an operator at the second loading station. The portion of items loaded at the first station 21 of this embodiment is selected dependent of data carrying information on the rate of manual loading an operator is able to perform in given operational conditions.

Figure 15:
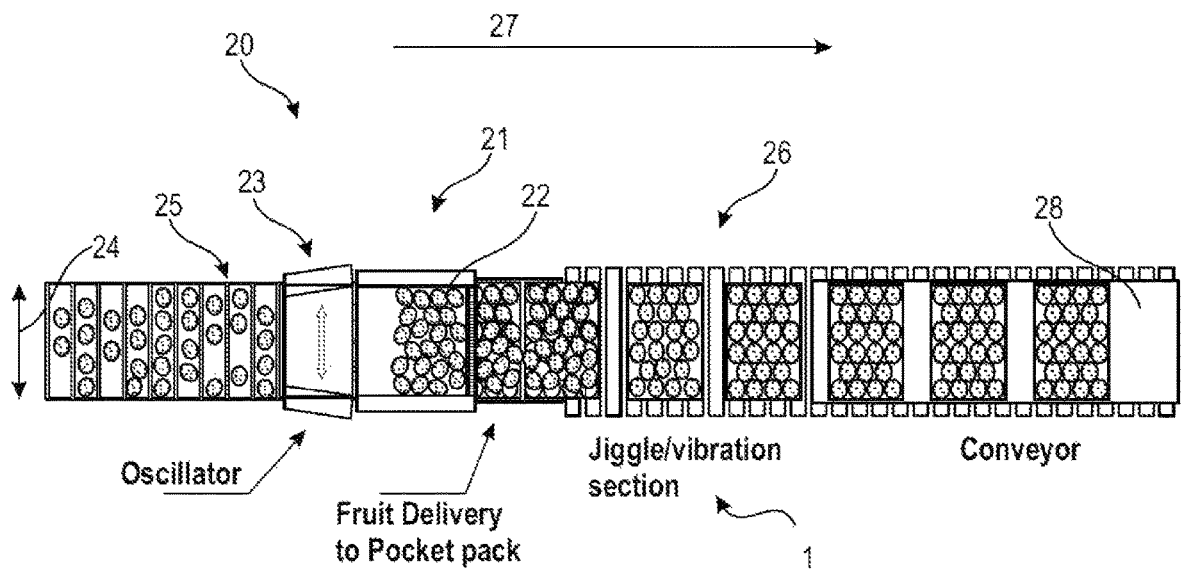
FIG. 15 shows a plan view of the apparatus 20 of FIG. 14.

FIG. 15 shows a plan view of the apparatus 20 of FIG. 14. As illustrated in FIG. 14 the ramp 22 is loaded with items 3 by an oscillating distributor 23 so the items 3 are distributed over the width 24 of the apparatus 22, ramp 22 or tray 1. The ramp allows items 3 to slide or role towards a tray 1 while preserving the distribution of items over the width 24 provided by the oscillating distributor 23. The oscillating distributor 23 is fed with a conveyor 25.

The loading station 21 as illustrated in FIG. 14 has a set of rollers 26 extending laterally to a direction of movement of the trays 27. A tray 1 moving over the rollers 26 will be agitated causing the items received to be agitated to move laterally to the tray 1 and beds 2. This movement will typically involve parts of the items 3 moving in the settling regions 15 and the items settling in the bedding regions 13. The rollers may be referred to as a jiggle or vibration section of the apparatus 20. In some embodiments the rollers may be dimensions and spaced to cause the tray 1 to flex to agitate the items.

The apparatus 20 shown in FIG. 14 has a conveyor 28 to move trays from the first loading station 21.

A process of loading trays according to an embodiment of the invention will now be described.

Trays 1 are translated below a depositor ramp 21 at a first loading station 22 to receive a number of items. In this example, the rate of translation of the tray is controlled dependent on the number of items entering the ramp to index the number of pockets moving under ramps to the number of items to be deposited.

The items 3 are fed to a ramp 21 by an oscillator which distributes the items over the width of the tray. The items 3 typically are not all aligned with the beds 2 at this time.

The items 3 had been fed to the oscillator by a conveyor 25.

The trays move over a set of rollers 26. In this particular example trays are flexible and the rollers are dimensioned and spaced to flex the trays and cause the deposited items 3 to be agitated and move laterally to the tray and the pockets to settle in the bedding regions 13 which have a shape that is complementary to the shape characteristic determined by characterising a sample of items of a population, grade or type to be packaged using the trays.

The trays 1 at this point in the process of this embodiment will typically have 80% of beds 2 filled by items, now bedded after settling by agitation.

At a second loading station (not shown) the remaining approximately 20% of beds which have not received items are filled. In this embodiment these beds are filled manually by an operator at the second loading station. In an alternative embodiment the second station may be automated. In either embodiment the portion of pockets filled can be matched to a rate that a given operator, characteristic operator or automated process to fill empty pockets, to align any items not aligned or to settle any unsettled items.

Figure 17:
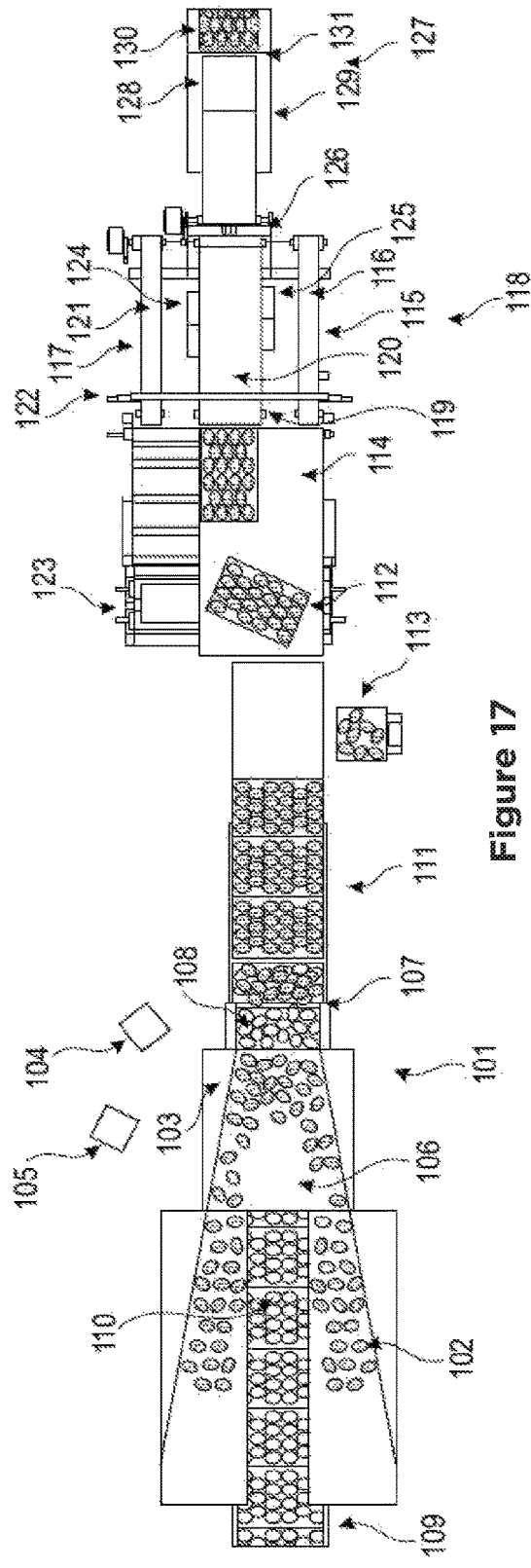
FIG. 17 shows, in plan view, a schematic diagram of an apparatus according to a preferred embodiment of the invention.
Figure 18:
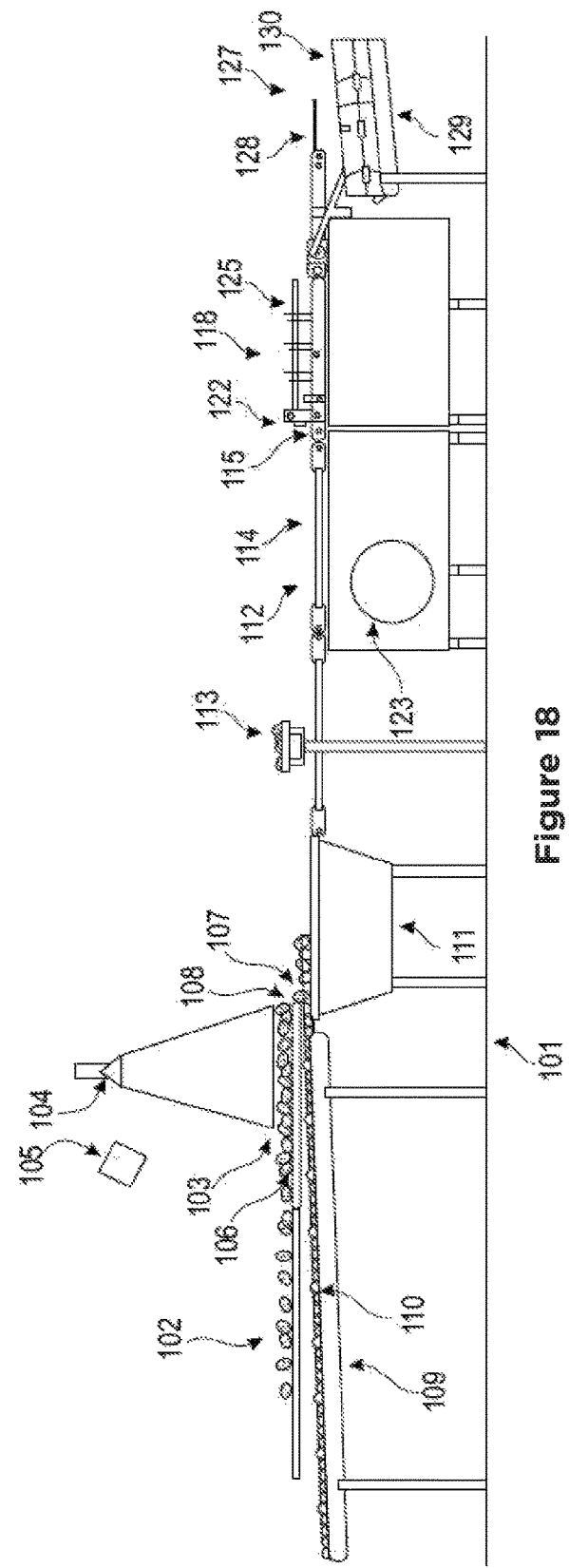
FIG. 18 shows, in sideview, a schematic diagram of a the apparatus of FIG. 1.

FIGS. 17 and 18 show an item packing apparatus 101 according to an embodiment of the present invention. The apparatus provides boxes of wrapped trays filled with items. In this embodiment the items are fruit. In this specific embodiment the items are kiwifruit which have been graded. FIG. 17 gives a plan schematic view with a direction of loading illustrated from left to right across the page.

The apparatus 101 has a marshalling station or stage 102, which receives items, transporting them to a consolidation stage 3. The consolidation stage 103 receives items and consolidates them in groups for quantity measurement. The consolidation stage has a conveyor 106 to move the items. The quantity measurement of items is performed with a camera 104 which feeds data to a controller or processor 105.

In this embodiment the processor 105 controls the camera 104. The conveyor 106 moves the items to a tray depositing device 107. In this embodiment the item depositing device is a ramp slide, or ramp, 108 which is filled with items by the conveyor 106 and allows the items to slide or roll downward in the direction of loading of the apparatus.

The apparatus 1 shown in FIG. 17 has a tray conveyor 109 which conveys a tray 110 under the ramp 108 in the loading direction. In this example the conveyor translates the tray. The tray conveyor 109 has a position and speed which is controllable. In this embodiment the tray conveyor 109 is controlled dependent on data provided by the processor 105 to allow the tray conveyor to be moved dependent on a quantity of items assessed at the consolidation stage 103. In this embodiment the tray conveyor indexes the movement of the tray 110 to a number of items calculated as likely to fall in an item-wide section of the tray. This is, tray 110 is controlled to index the number of pockets of a tray exposed to the ramp 108 to the number of items to be deposited on the tray 110. Alternative control regimes may be used in alternative embodiments.

The apparatus 101 as shown in FIG. 17 has a vibration table 111 over which the tray 110 and items deposited on the tray moves. Whilst on this table the tray is excited in x and y directions thus shaking or vibrating the items in the tray. In this embodiment the pockets are formed to have a shape complementary to a shape characteristic measured for a population or sample of population of the items. In this embodiment the population is a grade of fruit and the pockets have a surface which cooperates with a profile of a shape characteristic of the grade of the given fruit. In this embodiment also the pockets have a surface adjacent the cooperating surface which extends upwards from the cooperating surface at a tangent to provide a surface and space to allow items to move when jiggled to settle into the cooperating surface.

The apparatus 101 has a turning station 112 which turns trays by approximately 90 degrees and loads them onto a conveyor 114. In this embodiment the trays 110 are elongate having a length which is approximately the width of the ramp 108 and table 111. The turning station 112 turns the trays 110 to align the length with the direction of loading. The applicant has observed that elongate trays 110 can be fed though stages of the apparatus more stably if fed lengthwise.

A wrapping station 118 is also shown in FIG. 1. The wrapping station 118 is able to receive trays 110 with items settled in pockets (not shown) and wrap these with a sheet of wrapping material (not shown).

The wrapping station 118 shown in FIG. 1 has a central conveyor 119 which is able to convey the sheet of wrapping material with wrapped tray in the loading direction. The central conveyor has a set of vacuum apertures 120 connected to a vacuum system (not shown) to hold the sheet of wrapping material against the central conveyor 119. A first portion of the sheet of wrapping material is held against the conveyor 119 by the action of the vacuum apertures and ambient air pressure.

The wrapping station shown in FIG. 17 has a first lateral conveyor 115 also with vacuum apertures 116 to force the sheet of wrapping material against the first lateral conveyor. The lateral conveyor is displaced laterally to the central conveyor 119 so the wrapping sheet being forced against the first lateral conveyor allows the first lateral conveyor to hold the sheet of wrapping material out as a second portion or lateral flap to the first or central portion central of the wrapping sheet.

The wrapping station 118 shown in FIG. 1 shows a second lateral conveyor 117 with vacuum apertures 121 displaced laterally from the central conveyor 119 on an opposite side of the central conveyor 119. The second conveyor 117 with vacuum apertures is able to hold a second lateral flap of the wrapping sheet out from a central part of the sheet of wrapping material.

The first lateral conveyor 115, central conveyor 119 and second lateral conveyor 117 are controlled to be able to synchronously move to allow the three conveyors to convey a thin sheet of material, forced against the conveyors.

The wrapping station 118 shown in FIG. 17 has a severing device 122 which is able to sever the sheet of wrapping material from a roll 123 of wrapping material to control the length of the wrapping material for each tray 110.

The wrapping station 118 shown in FIG. 17 has a first wrapping bar 124 which is able to move from under an extended lateral flap of wrapping material and over the central conveyor 1. In this embodiment the wrapping bar extends parallel to the central conveyor 119 and moves about a central axis of the central conveyor 119. By this action the first wrapping bar 124 is able to lift a lateral flap of the sheet of wrapping material, held extended laterally by the first lateral conveyor 15, and is able to deposit the lateral flap over a tray 110 resting on the central conveyor.

Similarly, a second wrapping bar 125 extending parallel to the central conveyor 119 is able to move about the central conveyor 119 from below a lateral flap of the sheet of wrapping material to deposit the lateral flap over a tray resting on a central part of the sheet of wrapping material forced onto the central conveyor.

By the action of first wrapping bar 124 and second wrapping bar 125 depositing the lateral flaps of the wrapping sheet over the tray the tray with items is wrapped.

The wrapping station 118 has an additional wrapping bar 126 which is perpendicular to the travel of the tray. The wrapping bar 126 is able to move downwards between the wrapping station 118 and box loading station 127 as the wrapped tray transitions from wrapping station 114 to box loading station 127. This allows the leading edge of the wrapping material to be moved below the level of the leading edge of the tray 110. This means the leading edge of the wrapping material will be wrapped under the leading edge of the tray as it continues its movement between wrapping station 118 and box loading station 127.

The apparatus 1 shown in FIG. 17 also has box-loading station 127. In this embodiment the box-loading station 127 has a ramp slide 128 down which a wrapped tray can slide.

A box conveyor 129 is arranged to locate a box tray 130 under the loading station such that a leading edge, leading in the loading direction, wrapped tray exiting the loading station 127 enters a leading end of a tray box 130. In this embodiment a tray box is a rigid tray which is able to support the weight of a number of similar tray boxes loaded with items. In this embodiment also the tray box is formed of a template of cardboard folded into a tray-shaped box. The box conveyor 129 is controlled to convey the tray box 130 with motion of a tray 110 in the loading direction. This allows the tray 110, which is flexible, to exit the box-loading station 127 and sit into a tray cavity defined by the tray box 130.

A jet 131 is arranged to direct a jet of air at the back of the tray 110 as it completes its loading into rigid tray box 130 to tuck the trailing edge of the wrapping material into the tray box.

Figure 19:
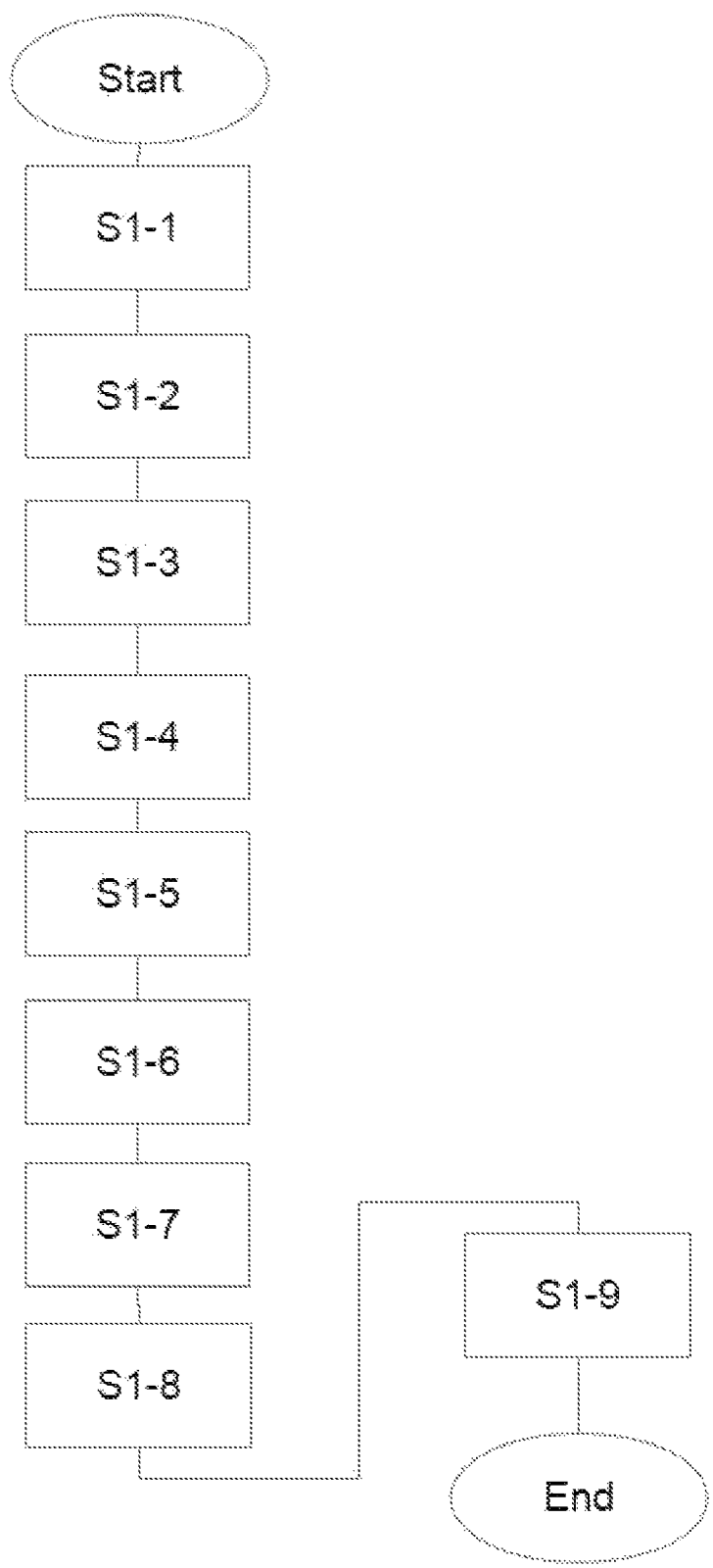
FIG. 19 shows a process diagram of a process according to a preferred embodiment of the present invention.

FIG. 19 shows a process according to a preferred embodiment of the present invention for providing packaged, wrapped and boxed items.

At step S1-1 a tray in which items have been loaded and settled is moved onto a leading edge of a sheet of wrap. In this particular embodiment the tray is moved down a ramp onto the leading edge of the wrap. The wrap extends laterally wider than the tray. The leading edge of the wrap extends along a central conveyor in a direction of travel of the arriving flexible tray.

At step S1-2 the tray slides onto the sheet near the leading edge of the wrap. The tray and the sheet are conveyed together until the tray is sitting completely on the wrapping sheet. In this embodiment the tray does not move relative to the wrapping sheet. Once the leading edge of the tray has touched the sheet, they are conveyed together along the belt.

The sheet of wrap also extends laterally to the central conveyor to provide lateral flaps of material.

The lateral flaps are retained in laterally extended configuration by first and second lateral conveyors.

The conveyors have vacuum apertures connected to a vacuum to retain the sheet of wrap against the conveyors.

At step S1-3 the leading edge of the wrap and tray is conveyed in a direction the arriving tray was moving and additional wrap is loaded onto the conveyor as the leading edge of the sheet and leading edge of the tray are conveyed to feed a section of sheet of wrap after the leading edge and arrange wrap under the length of the tray.

At step S1-4 a trailing edge of the sheet of wrap is severed from a leading edge of a sheet of wrap provided for a subsequently wrapped tray.

At step S1-5 a first wrapping bar moves about the central conveyor to release a first lateral flap from a first lateral conveyor and deposit it over the flexible tray.

At step S1-6 a second wrapping bar moves about the central conveyor to release a second lateral flap from a first lateral conveyor and deposit it over the flexible tray.

At step S1-7 the wrapping bar 126 moves downwards between the wrapping station 118 and box loading station 127 as the wrapped tray transitions from wrapping station 114 to box loading station 127. This allows the leading edge of the wrapping material to be moved below the level of the leading edge of the tray 110. This means the leading edge of the wrapping material will be wrapped under the leading edge of the tray as it continues its movement between wrapping station 118 and box loading station.

At step S1-8 the jet 131 directs a jet of air at the back of the tray 110 as it completes its loading into rigid tray box 130 to tuck the trailing edge of the wrapping material into the tray box.

At step S1-9 the wrapped tray is conveyed to a leading edge of a tray box, which is conveyed in synch with the flexible tray to deposit the wrapped flexible tray in the tray box. In this embodiment the tray is conveyed to a ramp which it moves down to a leading edge of the box.

In the embodiment of FIG. 1 the processor generates item quantity data which carries information on the quantity of items consolidated. The controller is able to control the tray conveyor. The controller is able specifically to control the movement of a tray on the conveyor by controlling the speed of the conveyor in the loading direction.

Further and additional embodiments will now be described.

Figure 16:
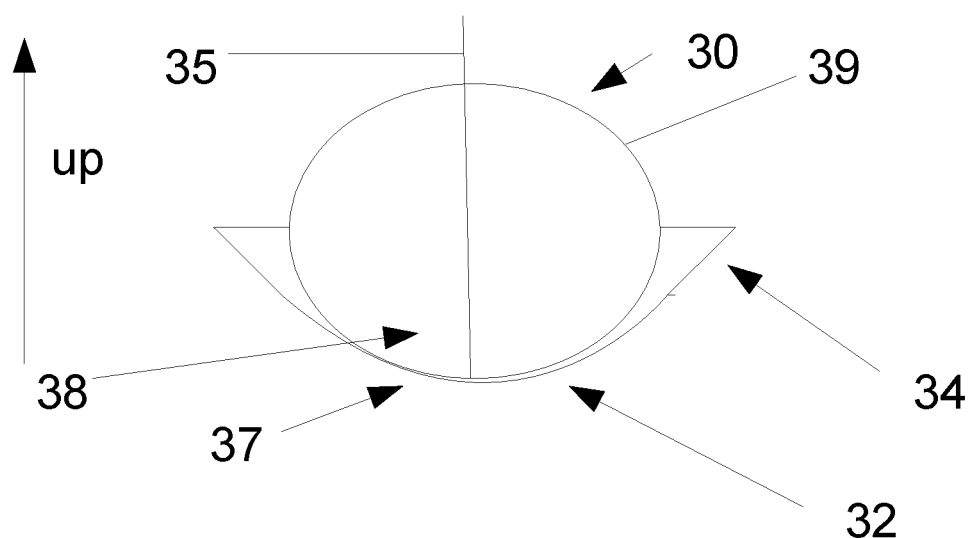

FIG. 16 illustrates a further embodiment of the present invention with a similar view to FIG. 12.

Shown in cross-section FIG. 16 is part of a packaging tray 30. In this example a section of the tray forming a pocket is shown in a longitudinal axis of an elongate item received in the pocket. The pocket has a concave surface 32 which has a cross-section which is concave upwards as shown on the page and shaped to cooperate with the shape characteristic of a population of items. In this example the population of items is a grade of a given variety of kiwi fruit and the shape characteristic is found by measuring a sample of the population. The pocket also has a surface 34 which, as shown in cross-section, extends outwards from the centre 35 of the concave section 32 and upwards as shown on the page. The cross-section of the surface 34 is substantially straight.

The tray 30 tray is shown with the surface 32 facing upward to receive. The surface 32 is shown concave upwards.

The substantially straight surface 34 is shown extending upwards as it extends away from the concave surface 32.

The concave section 32 is shown substantially conforming to a convex profile of part 37 of a hemisphere 39 of a shape characteristic of a population of items. The population in this example is a population of fruit selected from a wider population by a grading process. The population and/or wider population in this example is a fruit of a selected variety of fruit.

In some embodiments the separating region 17 may be defined by the settling surface 14.

In some embodiments the separating region 17 may be integral with the settling region 15.

In some embodiments the shape of the bedding surface is conformal to a shape characteristic determined for items to be received.

As illustrated the bedding surface has an upwardly concave shape and the settling surface has an upwardly convex shape. In some embodiments the settling surface may be a surface adjacent to the bedding region which is upwardly convex.

In some embodiments the bedding surface defines shape with a positive second differential of height with respect to progression away from the centre settling surface, with width or length, and the settling surface defines shape with a negative differential for similar progression away from the bedding region.

In some embodiments of the process of loading trays the number of items deposited at the first loading station may be determined so that a proportion of less than 90% of beds are filled.

In alternative embodiments a number of items that matches the number of trays are deposited onto the tray and the tray is jiggled or vibrated at a first station for a time which is likely to align a defined proportion of that number so the defined portion is likely bedded in the beds of the tray. The tray is then moved to a second station where the remaining items are aligned by an operator.

In some alternative embodiments a tray loading process for loading trays comprising multiple beds to receive the items when the items are aligned with the beds. In some embodiments a loading station deposits a number of items on a tray, and an agitator agitates the tray to apply agitation characterised to align a defined proportion of the number of items deposited to settle the proportion of the items in respective beds, and an operator aligns items not aligned by the agitator at an alignment station.

In some embodiments, agitation is characterised by applying agitation with differing time and/or differing amplitude and counting the number of aligned items. The characterisation may be performed for different trays.

In some embodiments the proportion may be approximately 80%.

In some embodiments the proportion may be between 60 and 99%.

In some embodiments the proportion may be between 70 and 90%.

In some embodiments the proportion may be set dependent on second-station-step data carrying information on a number of beds that can be filled or aligned by an operator having a characteristic rate of loading empty beds with items at the second station.

The second-step data may carry information adjusted for a rate of loading of trays.

In some embodiments there is a point of inflection between an upwardly concave surface of a pocket of a tray and a surface adjacent to that section.

In some embodiments the section adjacent is upwardly convex.

In further embodiments the fruit measuring apparatus includes a camera to detect when an area of the belt is full. This determines a volume of fruit based on how much white space on the belt is visible to the camera.

In further embodiments the measuring device includes an ultrasonic sensor in place of the camera.

In further embodiments the measuring device includes an ultrasonic sensor in addition to the camera.

In further embodiments the fruit measuring apparatus includes a camera that counts fruit.

In further embodiments a feedback system is incorporated to the fruit measuring apparatus by way of operators moving excess fruit delivered to tray 10 onto a weigh scale 13 or in the case of fruit shortage the operator moves fruit from the weigh scale 13 to the tray 10. The weigh scale 13 communicates with the processor 15 to fine tune the fruit delivery rate.

In a further embodiment the apparatus as shown in FIG. 17 has a set of rollers 111 over which the tray 110 and items deposited on the tray moves. The tray 110 of this embodiment is flexible and the rollers 111 present an undulating path for the tray 110 which causes the tray 110 to flex and causes the items to jiggle or vibrate and settle in pockets of the tray. In this embodiment the pockets are formed to have a shape complementary to a shape characteristic measured for a population or sample of population of the items. In this embodiment the population is a grade of fruit and the pockets have a surface which cooperates with a profile of a shape characteristic of the grade of the given fruit. In this embodiment also the pockets have a surface adjacent the cooperating surface which extends upwards from the cooperating surface at a tangent to provide a surface and space to allow items to move when jiggled to settle into the cooperating surface.

Embodiments of the invention have a camera and processor which estimate the number of items prior to being deposited on the tray. Embodiments have a loading conveyor located above a conveyor for a tray to be loaded. The loading conveyor in some embodiments is controlled to convey items to be deposited on the tray when a suitable number of items is ready to be conveyed onto the tray. This allows items to be received by the loader individually or in groups. Some embodiments have a scale which weighs the items deposited onto the tray to provide an input to for the control of the loading conveyor or feedback for the camera and processor which estimate the number of items.

In some embodiments the loading conveyor replaces a ramp used in other embodiments.

In some embodiments an oscillator is omitted from the apparatus.

In some embodiments a paddle or ram is used to tuck wrapping material into a box or behind a tray.

In some embodiments the paddle or ram is a substitute for a jet of air used in other embodiments.

Some embodiments have an agitation table to agitate a tray and items. In some embodiments the agitation table is able to move in two axes, such as longitudinally to pockets and transverse to pockets.

Embodiments of the present invention apply an ability to wrap trays and/or load wrapped trays in boxes to allow machine operations depositing items and/or settling items in pockets and/or aligning items with pockets without these operations being impeded by wrapping material or without requiring actions by an operator to handle the wrapping material. The ability to wrap trays and/or load wrapped trays allows wrapping material used to be supplied in rolls in place of tubes or bags which would be less efficient to handle and less cost effective. This advantage is applied to additional embodiments of the invention. Additional embodiments provide a process which agitates trays with deposited items and wraps the trays. Additional embodiments of the invention which provide an apparatus operable to agitates trays with deposited items and operable wrap the trays. Some further embodiments embodiment may omit steps of automated loading and/or loading trays into boxes of other embodiments described herein.

Additional embodiments have an item loading station where items are deposited and where the station is adapted for an operator to handle items to settle and/or align them also. In various embodiments the operator may handle the items before, after or during agitation.

Embodiments of the invention provide a process of providing boxes of wrapped trays of fruit which deposits items on trays which have bedding regions for the fruit and settling regions adjacent to the regions to facilitate items being settled into the bedding regions by agitation, where the process applies agitation and where the process subsequently wraps the trays with items settled in beds. Various embodiments load the trays into boxes.

Embodiments of the invention provide a process of providing boxes of wrapped trays of fruit which deposits items on flexible trays which have bedding regions for the fruit and settling regions adjacent to the regions to facilitate items being settled into the bedding regions by agitation by flexing of the tray, where the process applies agitation to settle the items and where the process subsequently wraps the trays with items settled in beds and subsequently loading flexible, wrapped trays into boxes.

Embodiments of the present invention provide a packaging tray for use in packaging items, the tray comprising:

a first region having a cross-section which is concave to define a surface suitable to receive an item of a characteristic shape; and a second region having a cross-section which is substantially straight.

The tray may have an upward surface onto which items are received from an upward direction and the concave cross-section may be concave in the upward direction.

The substantially straight cross-section may extend upwards as it extends away from the concave cross-section.

The concave cross-section may substantially conform to a downwardly convex profile of part of a hemisphere of a shape characteristic of a population of items.

The population may be a population of fruit selected from a wider population by a grading process.

The population and/or wider population may be of fruit of a selected variety of fruit.

The substantially straight cross-section may be arranged to direct fruit which is vibrated relative to the tray towards alignment with respect to the concave surface.

Embodiments of the invention provide a packaging tray operable to align items having a shape characteristic, the tray comprising:

a bedding surface having a profile arranged to spread pressure over part of the item; and a settling surface which defines a space adjacent to the bedding surface to allow movement of an item received in the bedding region, the movement being lateral relative to the tray.

The tray may have a shape which lies within a substantially planar prism and lateral movement relative to the tray may be movement parallel with the plane of said prism.

This space may allow agitation of the tray to cause movement of the item laterally over the bedding surface and adjacent space. This may facilitate settling of items onto the bedding surface.

The shape characteristic may be characteristic of a type of item to be packaged.

The shape characteristic may be characteristic of a population of items to be packaged.

The shape characteristic may be characteristic of a sample of a population of items.

In one aspect the invention provides a tray operable to receive one or more items having a shape characteristic, the tray comprising:

a bed defined by a bedding surface having a profile which is complementary with at least a part of the cross-section of the shape characteristic;

a settling region adjacent to the bed, the settling region defined by a settling surface directed away from the bed to allow space for an item to move laterally with respect to the bed under agitation of the item relative to the tray.

Lateral movement may be movement with a component of movement substantially parallel with the tray.

The shape characteristic may have an elongate cross-section.

The settling surface may be directed away from the bed at a point which is below a line bisecting the shape characteristic of an item received by the bed.

The settling surface being directed away from the bed at a point below the bisecting line may allow lateral movement of an item beyond the bed into the settling region. This movement may be under agitation of the tray relative to the item. This movement may be under agitation of the tray. This movement may be under agitation of the item. This may be under agitation comprising vibration.

The settling surface may be arranged to cause movement of the item contacting the settling surface with a component which is substantially perpendicular to the tray.

The settling surface may be arranged to direct an item contacting the settling surface during agitation towards the bedding surface.

The settling surface may be arranged to direct an item contacting the settling surface during agitation towards alignment with the bedding surface.

The tray may be a packaging tray.

The tray may be operable to be arranged in a stack of trays with items received therein.

This may allow agitation of the item relative to the tray to overcome friction between the item and the tray that otherwise might prevent an item placed on the bedding surface to bed with the centre or gravity of the item as low as possible in the tray.

This may allow agitation of the item relative to the tray to settle the item with a cross-section of the item oriented with the profile of the bedding surface.

This may orient the item to present a broad surface of the cross-section upwards and downwards.

This orientation may allow weight to be borne with pressure distributed over the item by nature of the shape characteristic with elongate cross-section having a surface which is less convex that ends of the elongate cross-section.

This may allow agitation of the item relative to the tray to overcome friction between the item and the tray that might prevent an item placed on the bedding surface to bed with the centre or gravity of the item as low as possible in the tray.

The settling region may be defined by a settling surface which is arranged to direct any item contacting the settling surface towards the bedding region.

The packaging tray may have tow of more settling regions at opposite sides of a bedding region.

The bedding region may be concave in a direction from which items are received and lateral movement may be lateral to said direction from which the items are received. Said direction from which the items are received may be in a direction to above the tray when the tray is arranged to receive items from above.

Embodiments of the present invention provide a package comprising one or more trays as described in any of the paragraphs above.

Embodiments of the present invention provide a package comprising two or more trays as described in any of the paragraphs above.

The two or more trays may be arranged in a stack.

The package may comprise fruit received in one or more beds of the one or more trays.

The package may comprise a stack of trays with fruit received therein with a first tray above a second tray in the stack being supported by items received in the second stack.

The shape characteristic of the items may have a cross-section which is elongate in two axes. The two axes may be perpendicular.

The bedding surface may be shaped complementary to the two or more axes of the elongate cross-section of the shape characteristic.

The bedding surface may be defined dependent on shape characteristic data collected from measurements of items.

The measurements may be taken for a sample or a population to characterise the shape of items.

The tray may comprise a settling surface arranged to provide space at two or more points at the periphery of the bedding region.

The items may be fruit.

The items may be kiwifruit.

The tray may be flexible to allow agitation of the item relative to the bed by moving a tray with received item over a roller.

Embodiments of the present invention provide an apparatus for packaging items using a tray comprising multiple beds to receive the items, the apparatus comprising:
- a loader operable to place a number of items on a tray, and
- an agitator operable to agitate the tray to settle the items in respective beds.

The process may comprise agitating the tray to settle the items in respective beds.

The step of depositing a number of items on the tray may comprise depositing a number of items that is a proportion of a number of beds of the tray.

The proportion may be less than 90%.

The proportion may be approximately 80%.

The proportion may be between 60 and 99%.

The proportion may be between 70 and 90%.

The proportion may be set dependent on second-station-step data carrying information on a number of beds that can be filled by an operative having a characteristic rate of loading empty beds with items at the second station.

The step of depositing a number of items on the tray may comprise depositing a number of items that exceeds the number of pockets in a tray. A process may comprise an operator removing excess items from the tray. The apparatus may have scales to provide feedback to the loading station, or a controller, on excessive loading of trays with items. The process may comprise weighing and communicating data carrying weight and/or excess feedback to a controller of the loading station.

The second-station-step data may carry information adjusted for a rate of loading of trays.

Embodiments of the present invention provide an apparatus for packaging items using a tray comprising multiple beds to receive the items, the apparatus comprising:
- a first loading station loader operable to deposit a number of items on a tray, and
- an agitator operable to agitate the tray to settle the items in respective beds.

The first loading station may be operable to distribute items over a width of the tray.

The first loading station may comprise a conveyor to load the depositor.

The first loading station may comprise an oscillating distributor operable to distribute items across a width of the conveyor, wherein the width of the conveyor is aligned with the width of tray.

The first loading station may comprise a depositor which is operable to substantially preserve the position with respect to the width of a tray and allows items to move towards the tray in a direction perpendicular to the width.

The apparatus may comprise a tray-conveyor operable to translate the tray past the first loading station.

The depositor may comprise a ramp.

The agitator may be operable to agitate the tray to settle the items in respective beds.

The agitator may comprise one or more rollers.

The first loading station may be operable to deposit a number of items on the tray, wherein the number of items that is approximately a defined proportion of a number of beds of the tray of any of the paragraphs above.

The beds may have a profile which is complementary with a cross-section of a shape characteristic of a population of the items, and wherein the tray further comprises a settling region adjacent to each bed and having profile directed away from the bed to allow space for an item to move with respect to the bed under the agitation to allow the item to settle in the bed.

The tray may be flexible and agitation may be performed by flexing the tray.

Flexing the tray may be performed by moving the tray over rollers.

Agitation may comprise vibration.

Agitation may comprise shaking.

The process may further comprise moving the tray to an alignment station at which an operator aligns items not settled in beds by the agitation to settle the item in the beds.

Embodiments of the present invention provide an apparatus for packaging items using a tray comprising multiple beds to receive the items when the items are aligned with the beds, the apparatus comprising:
- a loading station loader operable to deposit a number of items on a tray,
- an agitator operable to agitate the tray to apply agitation characterised to align a defined proportion of the number of items deposited to settle the proportion of the items in respective beds; and
- an alignment station at which an operator aligns items not aligned by the agitator.

Embodiments of the present invention provide a process for packaging items using a tray comprising multiple beds to receive the items, the process comprising:
- at a first loading station depositing a number of items on a tray, and
- at a second loading station loading items into beds which have not received items.

The process may comprise agitating the tray to settle the items in respective beds.

The step of depositing a number of items on the tray may comprise depositing a number of items that is a proportion of a number of beds of the tray.

The proportion may be less than 90%.

The proportion may be approximately 80%.

The proportion may be between 60 and 99%.

The proportion may be between 70 and 90%.

The proportion may be set dependent on second-station-step data carrying information on a number of beds that can be filled by an operative having a characteristic rate of loading empty beds with items at the second station.

The second-step data may carry information adjusted for a rate of loading of trays.

The step of depositing may comprise depositing items as the tray is translated past the first-loading station.

The process may comprise a step of distributing items over the width of the tray using an oscillator.

The process step may comprise loading a depositor which substantially preserves the position with respect to the width of a tray and allows items to move towards the tray in a direction perpendicular to the width.

The process may comprise loading a depositor comprising a ramp.

The step of distributing items over the width of the tray may comprise depositing items of a conveyor which loads the depositor.

The process may comprise flexing the tray to settle the items in a pocket or bed.

The process may comprise shaking the tray to settle the items in a pocket or bed.

The process may comprise vibrating the tray to settle the items in a pocket or bed.

The process may comprise agitating and/or flexing and/or shaking and/or vibration the tray to settle the items in a pocket or bed to align the items with a pocket and/or bed.

Embodiments of the present invention may comprise a tray as defined in any of the paragraphs above wherein a bed provides a pocket to receive an item.

Embodiments of the present invention may comprise pockets, each pocket providing a bed and/or bedding surface of any of the paragraphs above.

Embodiments of the present invention provide a process of packaging items comprising the steps of:
- depositing items onto a tray having pockets for individual items;
- wrapping the tray and deposited items with a sheet of wrapping material; and
- loading the wrapped tray into a box which defines a tray cavity to receive the tray with deposited items.

Loading the tray into the box may comprise moving the tray in a loading direction, depositing a leading edge of the tray in the loading direction into a leading edge of a cavity provided by the tray box in the loading direction and moving the box at a rate which matches the rate of movement of the tray to allow the tray with deposited items to be loaded into the tray cavity with items retained in pockets.

Loading the tray into the box may be subsequent to wrapping the tray and deposited items with a sheet of wrapping material.

The process may comprise extending a sheet of wrapping material over a conveyor which is operable to convey the tray in the loading direction, depositing the tray with deposited items onto the sheet of wrapping material to provide a wrapping layer under the tray.

The sheet of wrapping material may comprise a first part to provide an area on which to receive a deposited tray and may comprise one or more second portions dimensioned to extend over the tray to provide a wrapping layer over the tray with deposited items.

The process may comprise extending the sheet over a tray conveyor and over a sheet support arranged to hold the second portion of the sheet in an extended configuration in which the second portion extends out from the first portion.

The sheet support may comprise a lateral conveyor arranged parallel with the tray conveyor to support a second portion in the form of a lateral flap of wrapping material.

The tray conveyor and lateral conveyor may comprise a belt extending between two rollers and the tray conveyor and lateral conveyor may be operable to move to load the sheet of wrapping onto the conveyors from a roll of wrapping material.

The process may comprise holding the wrapping material onto a conveyor by a set of vacuum apertures connected to a vacuum source.

The process may comprise conveying the sheet of material with tray deposited thereon.

The tray may be flexible.

The process may comprise flexing the trays to settle the items in the pockets.

Alternatively, the tray may be rigid.

The process may comprise agitating the trays to settle the items in the pockets.

The process may comprise vibrating the trays to settle the items in the pockets.

The process may comprise shaking the trays to settle the items in the pockets.

The items may be fruit.

The fruit may be kiwifruit.

Embodiments of the present invention provide a process of wrapping a tray on which items are deposited, the process comprising:
- providing a sheet of wrapping material over a conveyor which provides a lower-wrapping region on which the tray is deposited;
- depositing the tray with items on the sheet of wrapping material on a central portion with one or more lateral portions extending laterally to the central portion; and
- moving a wrapping element from under a lateral portion of the wrapping sheet and over the deposited tray to deposit a lateral portion over the tray.

Embodiments of the invention provide a process for providing a package of boxed and wrapped items of fruit the process comprising the steps of:
- loading a tray with fruit;
- agitating the tray to settle the fruit in the trays;
- wrapping the loaded trays; and
- loading the wrapped trays into tray boxes.

Embodiments of the invention provide a process for providing a package of boxed and wrapped items of fruit the process comprising the steps of:
- loading a flexible tray with fruit;
- flexing the tray to settle the fruit in the trays;
- wrapping the loaded trays; and
- loading the wrapped trays into tray boxes.

Embodiments of the present invention provide an apparatus operable to wrap a tray on which items are deposited, the apparatus comprising:
- a conveyor operable to hold thereon a sheet of wrapping material to provide a lower-wrapping region on which the tray is deposited;
- a tray depositing station operable to deposit the tray on a first portion of the sheet of wrapping material with a second portion extending from the first portion;
- a wrapping element operable to move from under the second portion of the wrapping sheet and over the deposited tray to deposit the second portion over the tray to provide wrapping material over an upper surface of the tray.

Embodiments of the present invention provide an apparatus operable to package items, the apparatus comprising:
- a depositing device operable to deposit items onto a tray having pockets for individual items;
- a wrapping device operable to wrap the tray with items deposited with a sheet of wrapping material; and
- a loading device operable to load the wrapped tray into a box which defines a tray cavity to receive the wrapped tray with deposited items.

The apparatus may further comprise a transverse wrapping bar operable to move past a leading end of a tray in the loading direction to arrange wrapping material extending from the leading end to extend down over the leading edge so the wrapping material will extend under the tray as it moves into the tray box.

The apparatus may further comprise a device operable to arrange wrapping material at a trailing edge of the tray in the loading direction over the tray. Said device may be a jet operable to provide a jet of air to move the wrapping material.

The apparatus may comprise an agitation station operable to move items within in the tray after they have been deposited.

Embodiments of the present invention provide a tray loading apparatus comprising:
- an item depositing device operable to deposit items onto a tray;
- a tray conveyor operable to convey the tray in a direction of movement of items being deposited;
- a measurement device operable to generate item quantity data carrying information on the quantity of items in the depositing device; and
- a controller operable to control the tray conveyor and operable to control the conveyor dependent on the item quantity data.

In various embodiments a controller may be any known programmable logic array, processor, microcontroller, computer, cloud service or other controller known to the reader to be suitable for any given application.

In the preceding description and the following claims the word "comprise" or equivalent variations thereof is used in an inclusive sense to specify the presence of the stated feature or features. This term does not preclude the presence or addition of further features in various embodiments.

In the preceding description and the following claims the word "a" or equivalent variations thereof is used in an inclusive sense to specify the presence of the stated feature or features. This term does not preclude the presence or addition of further features in various embodiments. For example an apparatus described as comprising "a" feature and may comprise "another" feature.

In various embodiments a pocket has a bed, or begging region, and a settling region or equivalent. In other embodiments a settling region, settling surface or equivalent is adjacent to a pocket.

It is to be understood that the present invention is not limited to the embodiments described herein and further and additional embodiments within the spirit and scope of the invention will be apparent to the skilled reader from the examples illustrated with reference to the drawings.

In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention as defined in the appended claims.

What we claim is:

1. A process of wrapping a tray on which items are deposited, the process comprising:
   providing a sheet of wrapping material over a conveyor provide a first portion of the sheet on which the tray is to be deposited, the first portion of the sheet held onto the conveyor;
   providing one or more second portions of the sheet of wrapping material in the form of a lateral flap of wrapping material, the lateral flap held onto a lateral conveyor arranged parallel with the conveyor which provides the first portion on which the tray is deposited, wherein the sheet extends over the conveyor which provides the first portion on which the tray is to be deposited and over the lateral conveyor to hold the one or more second portion of the wrapping sheet in an extended configuration in which the one or more second portions extend laterally to the first portion;
   depositing the tray with items on the sheet of wrapping material on the first portion with the one or more second portions extending laterally to the first portion; and
   moving a wrapping element from under one of the one or more laterally extending second portions of the wrapping sheet and over the deposited tray to deposit a second portion over the tray.

2. The process of claim 1, wherein the sheet of wrapping material comprises the first portion on which to receive the deposited tray and comprises the one or more second portions dimensioned to be able to extend over the tray to provide a wrapping layer over the tray, wherein the process comprises a step of extending the sheet over a tray conveyor to provide the first portion onto which the tray is deposited and over the lateral conveyor arranged to hold the one or more second portions of the wrapping sheet in an extended configuration in which each second portion extends out from and substantially parallel to the first portion.

3. The process of claim 1 comprising a step of a wrapping bar which is perpendicular to the travel of the tray moving downwards between a wrapping station which comprises the first conveyor and a box loading station as the wrapped tray transitions from the wrapping station to a box loading station to cause a leading edge of the wrapping material to be wrapped under the leading edge of the tray as it continues its movement between wrapping station and the box loading station.

4. An apparatus operable to wrap a tray on which items are deposited, the apparatus comprising:
   a conveyor operable to hold thereon a sheet of wrapping film to provide a first portion on which the tray is deposited;
   a lateral conveyor arranged parallel with the conveyor which provides the first portion on which the tray is deposited, the lateral conveyor operable to hold thereon a second portion of the sheet of wrapping film in the form of a lateral flap of wrapping material extending over the lateral conveyor;
   a tray depositing station operable to deposit the tray on a first portion of the sheet of wrapping film with a second portion extending laterally from the first portion; and
   a wrapping element operable to move from under the second portion of the sheet of wrapping film and over the deposited tray to deposit the second portion of the sheet of wrapping film over the tray to provide wrapping film over an upper surface of the tray.

5. The apparatus of claim 4 comprising a leading edge device operable to arrange wrapping material which extends from the wrapped tray to be under a leading edge of the tray as it is moved into a box tray.

6. The apparatus of claim 5, comprising a trailing edge device operable to arrange wrapping material at a trailing edge of the wrapping film to be tucked into a box tray which receives the wrapped tray.

7. The apparatus of claim 5, comprising a transverse wrapping bar operable to move past a leading end of the tray in a loading direction in which the tray is conveyed by the conveyor which provides the first portion of the film said movement of the transverse wrapping bar being so as to arrange wrapping material extending from the leading end of the tray to extend down over the leading edge so the wrapping material will extend under the tray as it moves into the box tray.

8. The apparatus of claim 4, wherein the conveyor and lateral conveyor are operable to move to load the sheet of wrapping onto the conveyors from a roll of wrapping material.

9. The apparatus of claim 4, wherein the conveyor and lateral conveyor are operable to hold the sheet of wrapping film onto the respective conveyor by vacuum apertures connected to a vacuum source.

* * * * *